(12) United States Patent
Healy

(10) Patent No.: US 7,096,777 B1
(45) Date of Patent: Aug. 29, 2006

(54) AUTOMATED CORING MACHINE

(76) Inventor: Daniel P. Healy, 119 S. Bayly Ave., Louisville, KY (US) 40206

( * ) Notice: Subject to any disclaimer, the term of this patent is extended or adjusted under 35 U.S.C. 154(b) by 818 days.

(21) Appl. No.: 10/055,556

(22) Filed: Oct. 26, 2001

(51) Int. Cl.
A23N 4/12 (2006.01)

(52) U.S. Cl. .............................. 99/542; 99/543; 99/544; 99/546; 99/636

(58) Field of Classification Search .................. 99/542, 99/543, 544, 546, 636
See application file for complete search history.

(56) References Cited

U.S. PATENT DOCUMENTS

| 1,631,854 | A |   | 6/1927  | Carroll           |         |
|-----------|---|---|---------|-------------------|---------|
| 3,128,810 | A |   | 4/1964  | Whipp             |         |
| 3,151,644 | A |   | 10/1964 | Bainbridge et al. |         |
| 3,656,529 | A | * | 4/1972  | Vadas             | 426/482 |
| 3,700,017 | A | * | 10/1972 | Vincent et al.    | 99/590  |
| 3,780,641 | A |   | 12/1973 | Hole              |         |
| 3,806,620 | A |   | 4/1974  | Vadas             |         |
| 4,108,059 | A |   | 8/1978  | Loveland          |         |
| 4,252,056 | A | * | 2/1981  | Altman            | 99/551  |
| 4,373,432 | A |   | 2/1983  | Tsutsumi          |         |
| 4,441,413 | A |   | 4/1984  | Mori              |         |
| 4,497,245 | A |   | 2/1985  | Mori              |         |
| 4,546,545 | A |   | 10/1985 | Hirano            |         |
| 4,606,263 | A |   | 8/1986  | Ross et al.       |         |
| 4,653,393 | A |   | 3/1987  | Ross              |         |
| 4,690,047 | A |   | 9/1987  | Balzano           |         |
| 4,718,333 | A |   | 1/1988  | Pierce et al.     |         |
| 4,741,265 | A |   | 5/1988  | Cushman           |         |
| 4,834,795 | A |   | 5/1989  | Raub et al.       |         |
| 4,985,268 | A | * | 1/1991  | Bingham           | 426/482 |
| 5,067,397 | A |   | 11/1991 | Healy             |         |
| 5,133,250 | A |   | 7/1992  | Del Ser Gonzalez  |         |
| 5,142,972 | A |   | 9/1992  | Sundquist         |         |
| 5,231,921 | A |   | 8/1993  | Kirk              |         |
| 5,245,919 | A |   | 9/1993  | Neidigh           |         |
| 5,373,781 | A |   | 12/1994 | Knasel            |         |
| 5,454,301 | A |   | 10/1995 | Rainey et al.     |         |
| 5,463,943 | A |   | 11/1995 | Knasel            |         |
| 5,640,898 | A |   | 6/1997  | Tomelleri         |         |
| 5,787,801 | A |   | 8/1998  | Kirk et al.       |         |
| 5,957,045 | A |   | 9/1999  | He et al.         |         |
| 6,125,744 | A | * | 10/2000 | Martin            | 99/590  |
| 6,148,719 | A |   | 11/2000 | Poltielov         |         |
| 6,237,475 | B1 |  | 5/2001  | Ascari et al.     |         |
| 6,684,748 | B1 | * | 2/2004 | Mendenhall        | 83/369  |
| 6,718,868 | B1 | * | 4/2004 | Ismail et al.     | 99/584  |
| 2003/0039732 | A1 |  | 2/2003 | Blasco Piquer et al. | |
| 2003/0121422 | A1 |  | 7/2003 | Mendenhall        |         |

FOREIGN PATENT DOCUMENTS

| EP | 509487       | 10/1937 |
|----|--------------|---------|
| EP | 764717       | 1/1957  |
| EP | 1569019      | 6/1980  |
| WO | WO 02/087364 | 11/2002 |

* cited by examiner

Primary Examiner—Anthony Weier
(74) Attorney, Agent, or Firm—James E. Cole; Middleton Reutlinger

(57) ABSTRACT

An automated high volume coring machine having a frame, a lifting device, a coring station, and a programmable controller. The lifting device having a scoop for lifting the produce into the coring station. The coring station having removing the skin and core of the produce.

24 Claims, 5 Drawing Sheets

US 7,096,777 B1

AUTOMATED CORING MACHINE

BACKGROUND OF THE INVENTION

Technical Field of the Invention

The present invention relates to a high volume coring machine. More particularly, the present invention relates to an automated high volume produce coring machine which receives produce, feeds the produce to a coring station, and removes the core and skin of the produce before a subsequent cycle for another produce.

SUMMARY OF THE INVENTION

It is an object of the present invention to provide a produce coring machine.

It is a further objective of this invention to provide an automated produce coring machine.

It is yet an even further objective of the present invention to provide an automated high volume produce coring machine.

It is still an even further objective of this invention to provide an automated coring machine, comprising a frame having a feed area and a lifting device, a coring station mounted to the frame and receiving the lifting device and, a programmable controller in electric communication with the lifting device and the coring station. The programmable controller is preferably a PLC fixedly attached to the frame and the lifting device comprises an arcuate scoop having a feed area gate depending from the scoop. The automated coring machine scoop further comprises a switch in electrical communication with the programmable controller and the lifting device further comprises a fluid cylinder operably connected to the arcuate scoop. The fluid cylinder of the lifting device further comprises an upper and a lower limit switch in electronic communication with the programmable controller.

The automated coring machine further comprises at least one blade spaced between the scoop and the coring station, the blade being positionally adjustable.

The coring station further comprises a first fluid cylinder having a push plate mounted on a piston of the first fluid cylinder and the first fluid cylinder having limit switches in electrical communication with the programmable controller.

The automated coring machine further comprising a centering mechanism aligned with the push plate and spaced between the push plate and a circular blade, the circular blade being removably attached to said frame. The automated coring machine further comprising a coring tube axially aligned with the circular blade.

The coring tube extends through a push donut mounted to the frame and being connected to a second fluid cylinder linearly aligned with the centering mechanism and the circular blade. The second fluid cylinder has limiting switches in electrical communication with the programmable controller.

A method of coring produce, comprising positioning the produce, cutting at least one flat surface in the produce, lifting the produce to a coring station, forcing the produce through a centering mechanism, removing an outer surface of the produce with a circular blade, impaling a produce with said coring tube, and removing the coring tube from the produce.

All of the above outlined objectives are to be understood as exemplary only and many more objectives of the invention may be gleaned from the disclosure herein. Therefore, no limiting interpretation of the objectives noted are to be understood without further reading of the entire specification and drawings included herewith.

BRIEF DESCRIPTION OF THE DRAWINGS

The aspects and advantages of the present invention will be better understood when the detailed description of the preferred embodiment is taken in conjunction with the accompanying drawings, in which.

DETAILED DESCRIPTION OF THE PREFERRED EMBODIMENT

Figure 1:
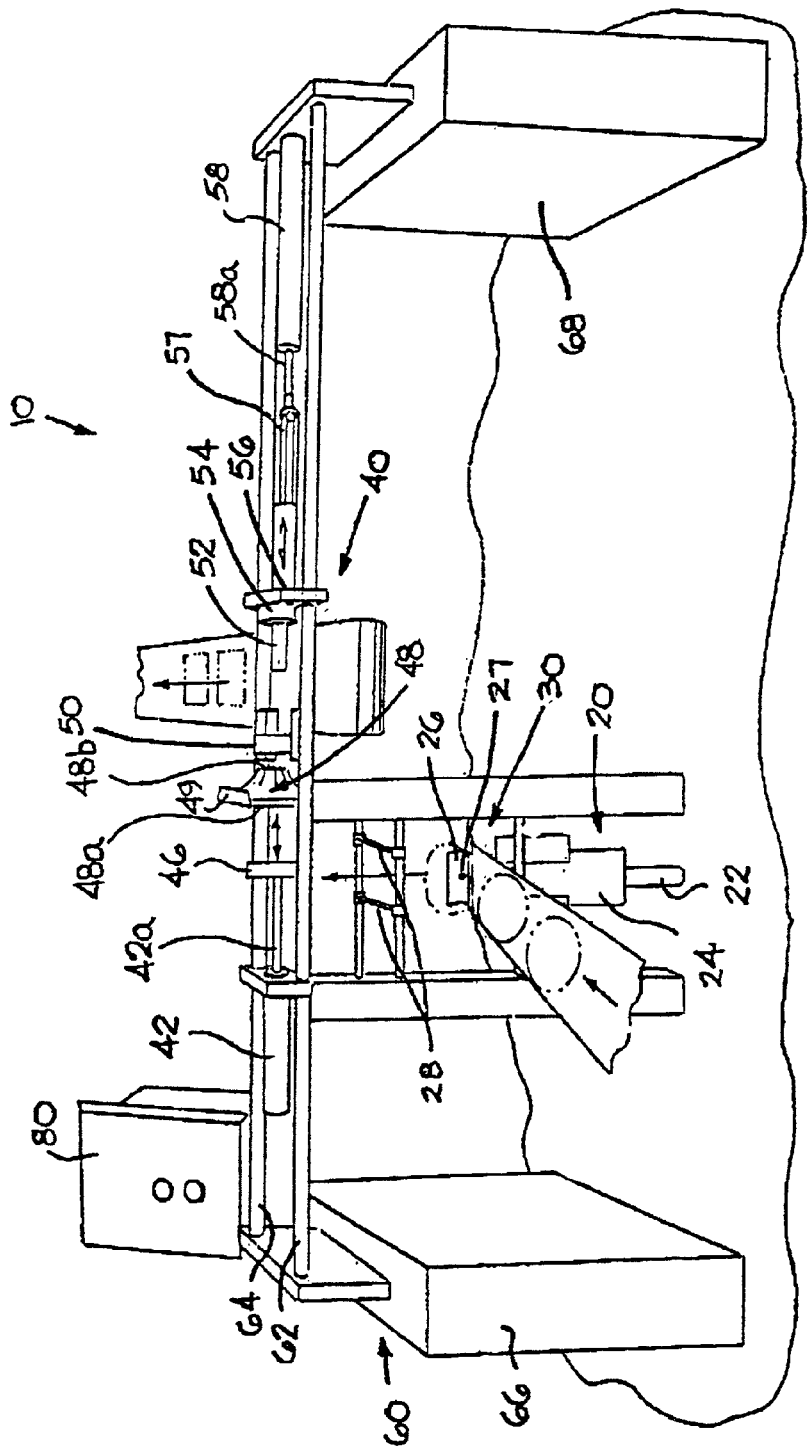
FIG. 1 shows a perspective view of the automated pineapple coring machine of the present invention.
Figure 2:
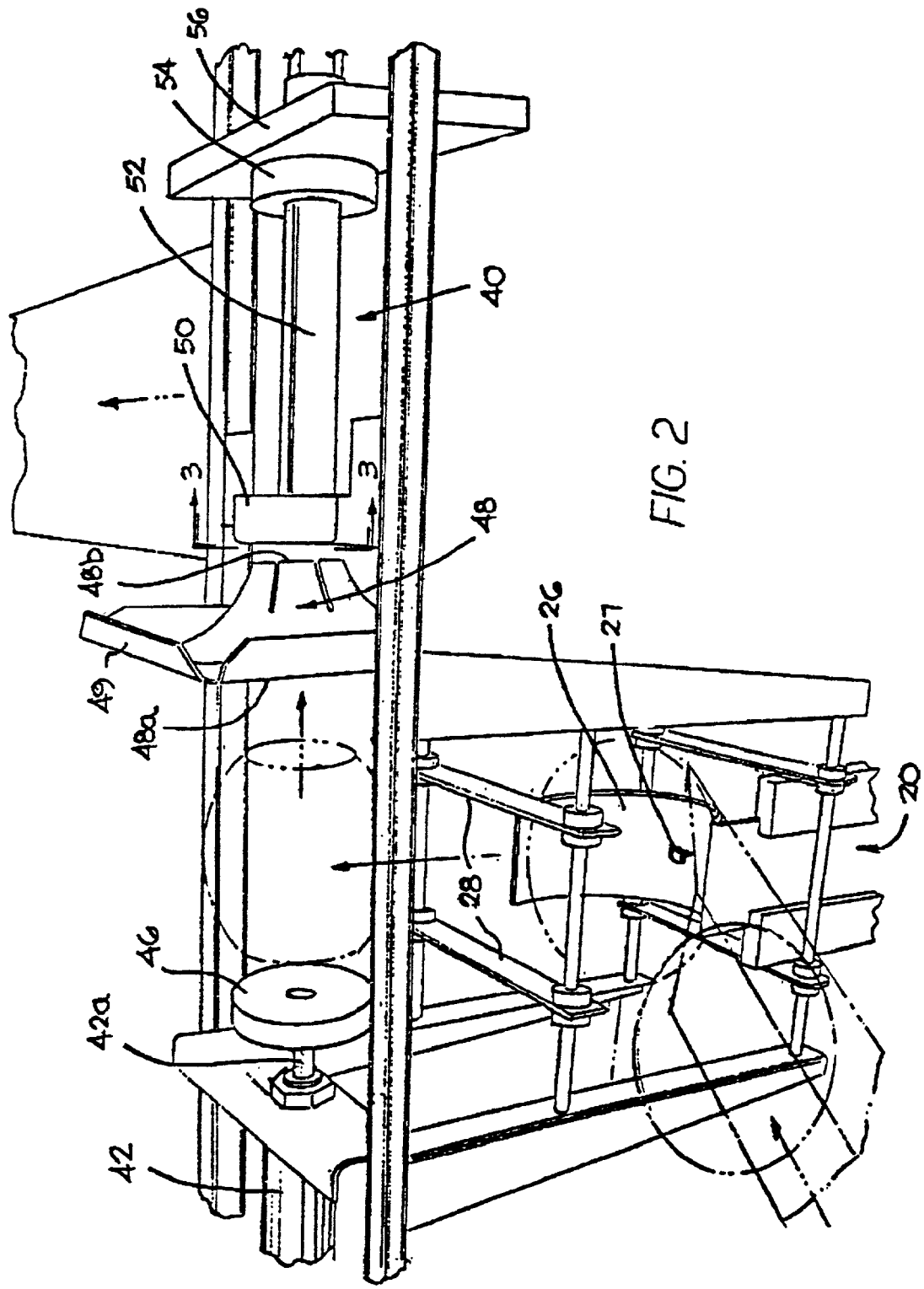
FIG. 2 shows an upper perspective view of the lift device and coring station of the coring machine shown in FIG. 1.
Figure 4D:
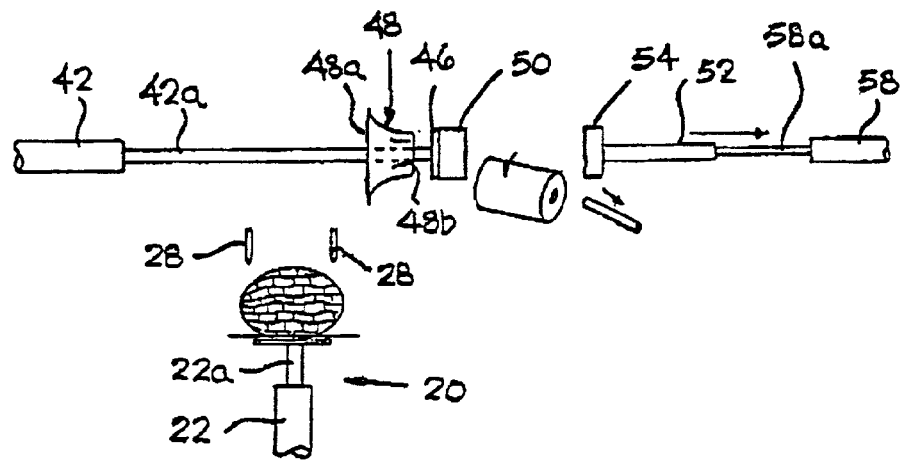
FIG. 4D shows a cored produce being removed from automated coring machine of the present invention; and, FIG. 5 shows a wiring diagram between the programmable controller and the limit switches of the fluid cylinders.
Figure 3:
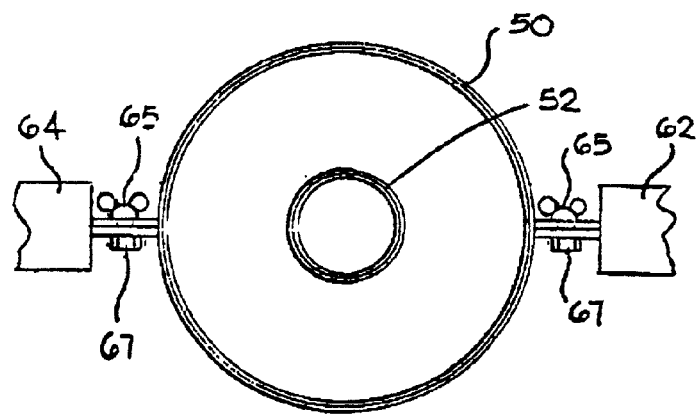
FIG. 3 shows an end view of the coring blade used in the automated coring machine of FIG. 1.
Figure 4A:
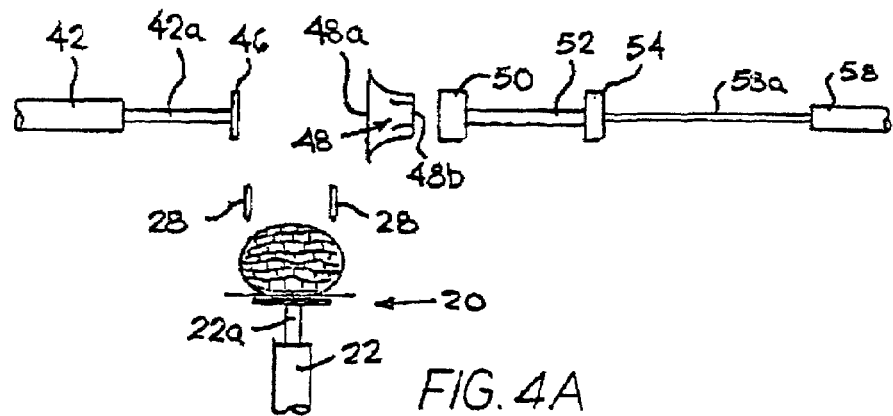
FIG. 4A shows the lift device of the present invention in FIG. 1.
Figure 4B:
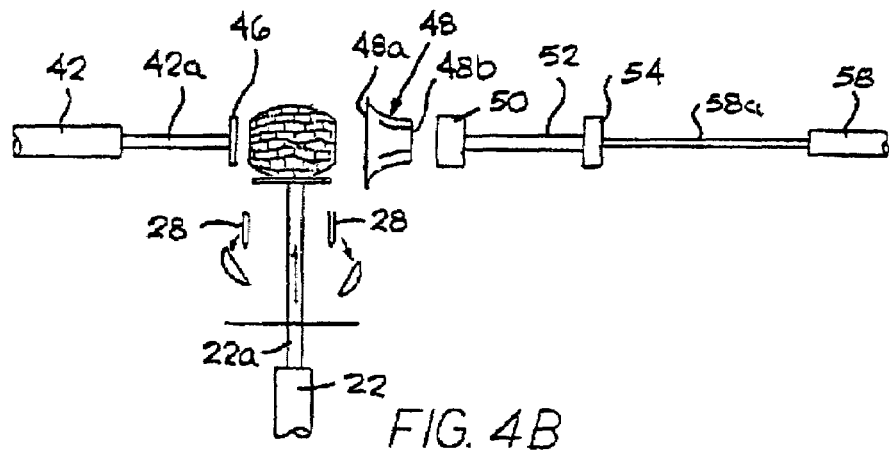
FIG. 4B shows the lift device of the present invention in the fully extended position.
Figure 4C:
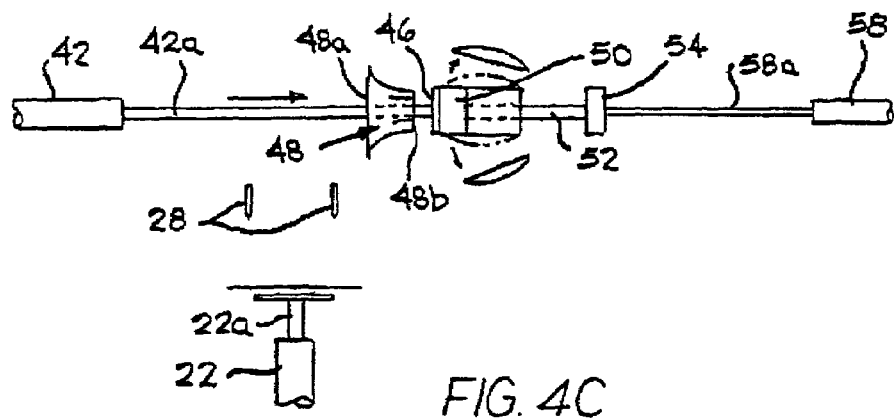
FIG. 4C shows a produce moving through the coring station of the present invention of FIG. 1.
Figure 5:
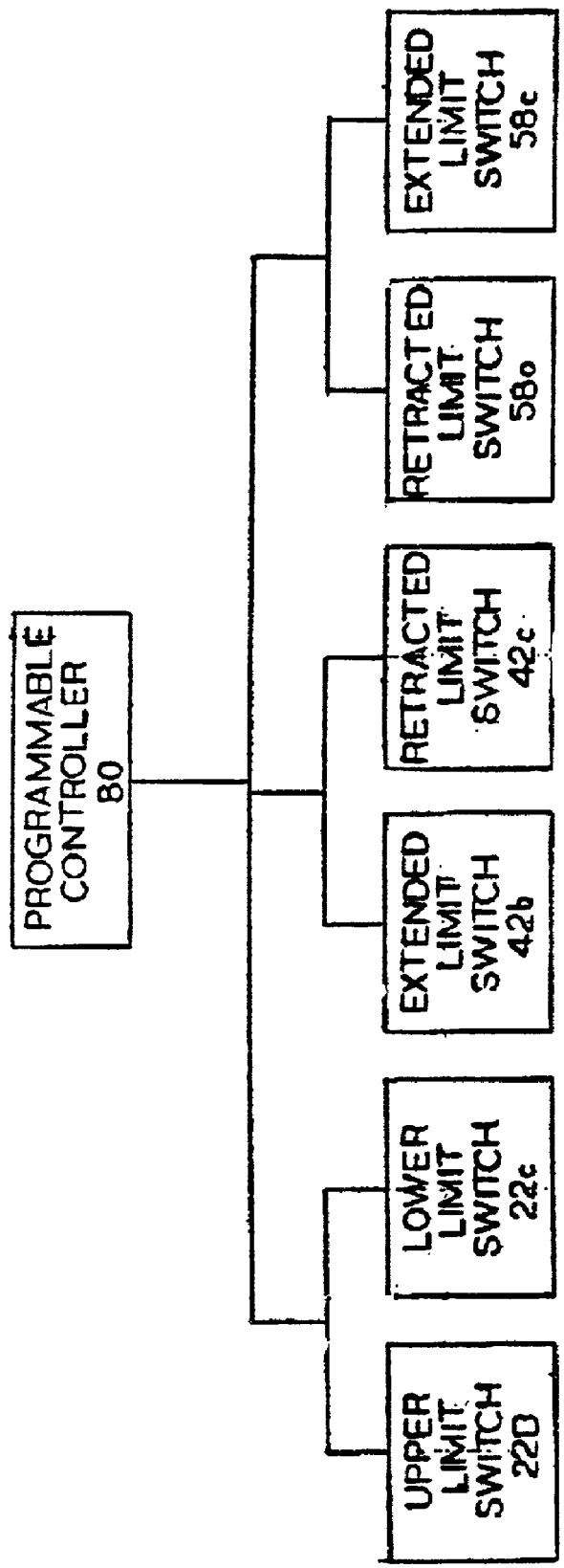

Referring to FIGS. 1–5 an automated coring machine 10 is shown for coring produce such as pineapples. The coring machine 10 preferably has a lifting device 20, a coring station 40, and frame 60.

The frame 60 comprises parallel first and second members 62,64 and a first stand 66 and a second stand 68, which support the coring machine 10. Depending from frame 60 is a lifting device 20 for receiving produce from a feeding device such as a conveyor belt. The lifting device 20 inhibits bruising of the produce such as might happen if the produce is dropped into the coring station 40. The lifting device 20 comprises a fluid cylinder 22 having a piston 22a which extends and retracts between first and second positions but may normally be in a retracted position. The piston 22a is operably connected to a scoop 26 and has upper and lower limit switches 22b,22c. The fluid cylinder 22 may be operated by compressed air or hydraulic fluid. The scoop 26 may be made of plastic or preferably stainless steel. The lifting device 20 also comprises a feed area gate 24, preferably integral with the scoop 26 and depending from a side of the scoop 26 facing the feed area 30. The feed area gate 24 stops produce from entering the feed area 30 when the scoop 26 is in an upper position by extending through the feed area 30. The scoop 26 preferably has an arcuate shape and a switch 27 within the scoop 26 for signaling that a produce is located therein. This signals the programmable controller 80 to start a coring machine 10 cycle. The switch 27 and upper and lower limit switches 22b, 22c are all in electrical communication with a programmable controller 80, preferably a programmable logic controller (PLC). The programmable controller 80 is preferably fixedly attached to the coring machine 10, but may be moved away from the coring machine 10 such as to a central room or the like.

At least one blade 28 is provided between the lifting device 20 and a coring station 40. The at least one blade 28, preferably two blades, are slidably attached to the frame 60 so that they may be centered with respect to the produce being cut. The at least one blade 28 is located within the path of travel of scoop 26. The at least one blade 28 may be slidably adjustable so to accept various sizes of produce for cutting.

Located above the lifting device 20 is a coring station 40. A first fluid cylinder 42 is mounted parallel to the frame 60, between the first frame member 62 and the second frame member 64. The first fluid cylinder 42 has a piston 42a, which is normally in a retracted position, and extended and retracted limit switches 42b, 42c. The limit switches 42b and 42c are in electrical communication with the programmable controller 80 and signal the controller 80 that the first fluid cylinder 42 is in either a fully extended or retracted position. Attached to piston 42a is a push plate 46 which moves as piston 42 extends and retracts in a path parallel to frame 60. Located adjacent the push plate 46 is a centering mechanism 48 having a frusto-conical shape with a first larger aperture 48a transitioning to a second smaller aperture 48b. The centering mechanism 48 is operably attached to the first and second frame members 62,64 by a plate 49 and is axially aligned with the first fluid cylinder 42 and push plate 46, within first and second frame members 62,64. The plate 49 is preferably made of stainless steel and has a hole therein where the centering mechanism 48 extends through and is affixed. The centering mechanism 48 is preferably made of plastic.

A circular blade 50 may be axially aligned with the second smaller aperture 48b of centering mechanism 48 and is removably attached to the first and second frame members 62,64 so that blades of various diameters may be used to remove the skin from various produce types. The circular blade 50 may, for example, be attached to first and second frame members 62,64 by using bolts 67 and wing nuts 65 or some other such easily removable mechanisms. The circular blade 50 may be made of metal, preferably stainless steel.

Adjacent the circular blade 50 is a coring tube 52 which is slidably mounted within the frame 60, axially aligned with the circular blade 50, and operably attached to a piston 58a of second fluid cylinder 58. Coring tube 52 is of a smaller diameter than circular blade 50 and may extend through a push donut 54, a donut plate 56, and when piston 58a is in a fully extended position, through the circular blade 50. Preferably piston 58a is connected to coring tube 52 by at least one linkage arm 57. As piston 58a moves from a retracted to an extended position, coring tube 52 slides through donut plate 56, push donut 54, and through circular blade 50. Second fluid cylinder 58 is fixedly attached to the frame 60 within the first and second frame members 62,64 and axially aligned with the centering mechanism 48 and circular blade 50.

Donut plate 56 is fixedly attached the first and second frame members 62,64. Push donut 54 is located on a side of the donut plate 56 adjacent the circular blade 50 and may be made of metal or stainless steel, but is preferably a plastic material.

Second fluid cylinder 58 may be operated by either compressed air or hydraulic fluid, and additionally has a first retracted limit switch 58b and a second extended limit switch 58c. The second fluid cylinder 58 may normally be in an extended position and the retracted and extended limit switches 58b, 58c are in electrical communication with the programmable controller 80.

In use, a produce feeding conveyor belt may be attached to the frame 60 near in the feed area 30 to deliver produce, such as pineapple, to the coring machine 10. As shown in FIGS. 4A–4D, the scoop 26 is initially in a lower position as piston 22a is retracted, allowing the pineapple to be positioned in the scoop 26. When the pineapple is positioned in the scoop 26, switch 27 activates the programmable controller 80 to begin the coring machine 10 cycle.

First, programmable controller 80 activates fluid cylinder 22 and the scoop 26 having a produce therein is raised between the at least one cutting blade 28. The, for example, two cutting blades 28 cut the ends of the pineapple extending past the scoop 26 sides creating two planar surfaces in the produce. The fluid cylinder 22 continues to raise the scoop 26 until the upper limit switch 22b is activated and the programmable controller 80 signals the fluid cylinder 22 to stop the piston 22a.

As the pineapple is held in an upper position within scoop 26, first fluid cylinder 42 is activated by the programmable controller 80 and begins extending push plate 46 and moving the pineapple through the coring station 40. The push plate 46 forces the pineapple through aperture 48a of centering mechanism 48. Push plate 46 continues extending and centering mechanism 48 properly aligns the pineapple before and during its entrance into the circular blade 50. As the push plate continues moving the pineapple through the centering mechanism 48 and through the circular blade 50, the outer skin of the pineapple is removed.

Since the second fluid cylinder 58 is normally in an extended position, coring tube 52 is adjacent the circular blade 50. As the first fluid cylinder 42 forces the pineapple through the circular blade 50, the center of the pineapple is impaled by the coring tube 52. Continued extension of the push plate 46 causes separation of the pineapple from its core as the core moves inside the coring tube 52 and the pineapple moves onto an outer surface of the coring tube 52. The extension of first fluid cylinder 42 stops as the extended limit switch 42b is reached. Push plate 46 is retracted until the retracted limit switch 42c is activated and first fluid cylinder 42 awaits the successive coring machine 10 cycle.

When the first fluid cylinder 42 retracted limit switch 42c is activated, a signal is sent to programmable controller 80. Programmable controller 80 then signals for second fluid cylinder 58 to begin retracting. With the pineapple riding on its outer surface, coring tube 52 begins retracting through push donut 54. This continues as the pineapple contacts the push donut 54 and is extracted from the push donut 54. When the pineapple is fully removed from coring tube 52, it falls on a conveyor belt or some such means for moving produce. When the retracted limit switch 58b is reached, a signal is sent to the programmable controller 80, and the second fluid cylinder 58 is extended to its normal position.

The invention may be embodied in various forms without departing from its spirit and essential characteristics. The described embodiments are not to be considered as restrictive.

I claim:
1. An automated coring machine, comprising:
  a frame having a feed area and a lifting device;
  a coring station mounted to said frame and receiving said lifting device; and,
  a programmable controller in electric communication with a fluid cylinder of said lifting device and a first and a second fluid cylinder of said coring station connected to said frame;
  said first fluid cylinder operably connected to a push plate and said second fluid cylinder operably connected to a coring tube;
  wherein said lifting device comprises an arcuate scoop having a feed area gate depending from said scoop.

2. The automated coring machine of claim 1, wherein said programmable controller is a PLC fixedly attached to said frame.

3. The automated coring machine of claim 1, wherein said scoop further comprises a switch in electrical communication with said programmable controller.

4. The automated coring machine of claim 1, wherein said lifting device fluid cylinder is operably connected to said arcuate scoop.

5. The automated coring machine of claim 4 wherein said fluid cylinder of said lifting device further comprises an upper and a lower limit switch in electronic communication with said programmable controller.

6. The automated coring machine of claim 1, further comprising at least one blade spaced between said scoop and said coring station, a position of said at least one blade being adjustable.

7. The automated coring machine of claim 1, said first fluid cylinder of said coring station having said push plate mounted on a piston of said first fluid cylinder and said first fluid cylinder having limit switches in electrical communication with said programmable controller.

8. The automated coring machine of claim 7 further comprising a centering mechanism aligned with said push plate and spaced between said push plate and a circular blade, said circular blade being removably attached to said frame.

9. The automated coring machine of claim 8 said coring tube axially aligned with said circular blade.

10. The automated coring machine of claim 9 said coring tube extending through a push donut mounted to said frame and being connected to said second fluid cylinder and axially aligned with said centering mechanism and said circular blade.

11. The automated coring machine of claim 10 said second fluid cylinder having limiting switches in electrical communication with said programmable controller.

12. An automated coring machine, comprising:
a frame having a feed area and a lifting device;
a coring station mounted to said frame and receiving said lifting device;
two slidably adjustable blades between said lifting device and said coring station;
a PLC in electric communication with said lifting device and said coring station;
wherein each of said lifting device and said coring station have at least one fluid cylinder connected to said frame and each of said at least one fluid cylinder being in electrical communication with said PLC;
said at least one fluid cylinder of said lifting device directing a material to said coring station, said at least one fluid cylinder of said coring station causing engagement of said material and at least one of said two blades.

13. The automated coring machine of claim 12 said lifting device further comprising a scoop having a feed area gate and a fluid cylinder having upper and lower limit switches, said cylinder having a piston operably connected to said scoop.

14. The automated coring machine of claim 13 said upper and lower limit switches electrically connected to said PLC.

15. The automated coring machine of claim 14 said coring station comprising a first fluid cylinder having a piston and a push plate attached to said piston.

16. The automated coring machine of claim 15 said first cylinder having an extended and a retracted limit switch in electrical communication with said PLC.

17. The automated coring machine of claim 15 further comprising a centering mechanism spaced between said push plate and a circular blade, and mounted to said frame.

18. The automated coring machine of claim 17 said coring station further comprising a coring tube axially aligned with and operably connected to a piston of a second fluid cylinder and extending through said circular blade.

19. The automated coring machine of claim 18 wherein said circular blade is removably connected to said frame.

20. The automated coring machine of claim 18 said coring tube further extending through a push donut fixedly attached to said frame.

21. The automated coring machine of claim 18 said second fluid cylinder having first and second limit switches in electrical communication with said PLC.

22. The automated coring machine of claim 12 said frame comprising at least two parallel bars for linear alignment of said coring station.

23. An automated coring machine, comprising:
a frame having a feed area and a lifting device;
a coring station mounted to said frame and receiving said lifting device;
a programmable controller in electric communication with said lifting device and said coring station;
wherein said frame has at least two parallel bars disposed adjacent to a feed area;
wherein said lifting device includes a scoop having a feed area gate depending therefrom and a piston of a fluid cylinder operably connected to a bottom surface of said scoop;
wherein said coring station includes a first fluid cylinder operably connected to a push plate, said first fluid cylinder connected to said frame;
a centering mechanism being frusto-conical in shape and mounted between said parallel bars;
a circular blade removably connected to said frame and axially aligned with said centering mechanism;
a coring tube extending axially through said circular blade, extending through a push donut, and operably connected to a second fluid cylinder;
said second fluid cylinder operably connected to said frame.

24. A coring machine, comprising:
a frame of at least two parallel bars;
a first fluid cylinder having a push plate operably connected to a piston of said first fluid cylinder;
a centering mechanism attached to said frame and axially aligned with said first fluid cylinder, said centering mechanism having a substantially frusto-conical shape with a first and second aperture;
a circular blade axially aligned with said first fluid cylinder and mounted to said frame adjacent a second aperture;
a coring tube axially aligned with said circular blade and operably connected to a second fluid cylinder;
said second fluid cylinder mounted to said frame and axially aligned with said first fluid cylinder; and,
a push donut fixedly attached to said frame, said coring tube extending through said donut.

* * * * *